United States Patent [19]

Baron

[11] Patent Number: 4,543,996

[45] Date of Patent: Oct. 1, 1985

[54] FLUID FLOW DIVERTER VALVE WITH IMPROVED FLOW-THROUGH CONSTRUCTION

[75] Inventor: Walter J. Baron, Mequon, Wis.

[73] Assignee: Water Services of America, Inc., Milwaukee, Wis.

[21] Appl. No.: 678,353

[22] Filed: Dec. 5, 1984

[51] Int. Cl.[4] .......................................... F16K 11/02
[52] U.S. Cl. ........................... 137/625.43; 137/625.47
[58] Field of Search ....................... 137/625.43, 625.21, 137/625.22, 625.47, 625.46, 874

[56] References Cited

U.S. PATENT DOCUMENTS

| 368,491 | 5/1943 | Ohno | 137/625.43 |
| 810,877 | 1/1906 | McKeown | 137/625.47 |
| 1,004,053 | 9/1911 | Madgett | 137/625.47 X |
| 1,534,958 | 4/1925 | Huss | 137/625.47 |
| 3,319,710 | 5/1967 | Heeren et al. | 165/25 |
| 3,973,592 | 8/1976 | Cleaver et al. | 137/625.43 |

FOREIGN PATENT DOCUMENTS

| 219096 | 2/1910 | Fed. Rep. of Germany | 137/625.43 |
| 82872 | 12/1953 | Norway | 137/625.47 |

*Primary Examiner*—Martin P. Schwadron
*Assistant Examiner*—John S. Starsiak, Jr.
*Attorney, Agent, or Firm*—Andrus, Sceales, Starke & Sawall

[57] ABSTRACT

A four-way diverter valve (1) is constructed with a rotatable butterfly valve element (20) within the cylindrical valve housing (10) and with said element having a pair of end heads (21, 22) joined by a generally planular central tapered plug (23) of longitudinal extent. The valve plug is modified by having mounted thereon between its ends a tubular diverter means (28) which comprises a pair of transversely extending pipe segments (25, 26), one mounted on each side of the plug, which forms a baffle. The valve housing (10) is connected to two pair of in-line ports (16–19) and stub pipes (31, 32) are fixedly mounted to the housing wall, communicate with a pair of diagonally opposed ports (16, 19), and extend inwardly from the housing wall toward the modified butterfly valve element (20) and the tubular diverter means (28). In normal valve position (FIG. 4), a generally straight-through fluid flow is provided. In reverse valve position (FIG. 5), the ends of the diverter pipe segments (25, 26) engage the ends of the stub pipes (31, 32) to provide a diagonally reverse fluid flow channel. Only two opposed cage bars (29) are utilized with the butterfly plug edges (24) sealing against the cage bars for substantially the full axial extent of the cylindrical housing, in normal valve position. The butterfly valve heads also seal against annular sealing surfaces (43, 44) on the housing. Simultaneously controllable sealing is accomplished both within and without the tubular diverter means (28).

12 Claims, 6 Drawing Figures

NORMAL

REVERSE

FLUID FLOW DIVERTER VALVE WITH IMPROVED FLOW-THROUGH CONSTRUCTION

BACKGROUND AND SUMMARY OF THE INVENTION

This invention relates to a fluid flow diverter valve with an improved flow-through construction.

It has previously been suggested that heat exchanger tubing may be internally cleaned by mounting brush-basket assemblies on the ends of the tubes, and then by flowing fluid first in one direction and then the other to cause the brushes to traverse the length of the tubes and then return to their original position. See the above-identified U.S. Pat. No. 3,319,710.

It has also previously been suggested as in the above U.S. Pat. No. 3,973,592 to utilize a fourway diverter valve for purposes of reversing fluid flow within the tubes to cause the cleaning brushes to move in both directions within the tubes. In diverter valves of the '592 type a butterfly valve element having head members joined by a central plug is rotatable between normal and reverse flow positions. Four cage bars are circumferentially spaced and form pairs of opposed seats for sealing engagement with the two edges of the valve plug to connect various chambers within the valve housing with upstream and downstream fluid flow lines, depending on the rotary position of the valve element.

Valves of the of the type shown in U.S. Pat. No. 3,973,592 are subject to several disadvantages. The use of four cage bars for plug sealing, and the utilization of numerous walls and partitions within the valve housing, creates a complex structure which is expensive to manufacture and service. Furthermore, some of the fluid flow paths through the valve housing are quite tortuous, resulting in high pressure drop which is especially undesirable in the more frequently used normal flow position. In some instances, the fluid is caused to make as much as a complete 360° turn within the valve.

A more recently developed diverter valve has been thought to solve some of the problems of the above-described type of valve. The more recently developed valve, sometimes called a "pipe" valve, is disclosed in my co-pending U.S. patent application Ser. No. 06/475,203, filed Mar. 14; 1983 and entitled "Four-Way Fluid Flow Diverter Valve", now U.S. Pat. No. 4,506,703, issued Mar. 26, 1985. In the pipe valve of my aforesaid application, a cylindrical housing is provided with the usual pairs of in-line upstream and downstream ports, and contains a tubular diverter having a central diametrical baffle which forms separate but parallel fluid flow passages therein. The tubular diverter is rotatable between normal and reverse flow positions, and the diverter length approximates the diameter of the cylindrical housing. The diverter ends are constructed to sealingly seat on concave seat members forming part of the valve body and disposed adjacent a pair of diagonally opposed valve ports. In addition, the tubular diverter is provided on its exterior with diametrically opposed longitudinally extending radial ribs which are adapted to engage stop members which in turn are disposed on the end closure plates for the cylindrical wall of the housing. The engagment of the tubular diverter ends with the cylindrical valve body seats, and the engagement of the said ribs with the said stop members are intended to substantially reduce by-passing of fluid between the supply or high pressure side and the return or low pressure side of the valve, especially when the diverter is in normal position. The tubular diverter may be adjusted along its rotary axis for controlling and preferably reducing the said fluid flow by-passing.

The pipe valve of the type described above is much more simply constructed than the valve of U.S. Pat. No. 3,973,592 and is thus less expensive to manufacture and maintain. Furthermore, when the tubular diverter element is in its most frequently used normal position, supply and return fluid flows are almost in a straight line through the valve chamber and diverter, thus reducing undesirable pressure drop to a minimum.

It has been discovered that while the above-described pipe valve has substantially solved the problems of complexity, cost and pressure drop, it is subject to other disadvantages.

Under high pressure conditions, it has been observed that the fluid flowing through the pipe valve may under certain conditions cause distortion of the cylindrical valve housing. In such a situation, the housing becomes out of round and the seals between the tubular diverter ends and the concave valve housing seats no longer are in full contact and are effectively broken, thus permitting undesirable leakage from the high to the low pressure side. Distortion of the said stop members may also cause by-passing leakage along the diverter sides. While such leakage may be tolerated when the tubular diverter is in its short-term reverse position, it is undesirable in the long-term normal position. The distortion-caused leakage may under some circumstances be substantially reduced at the tubular diverter ends by a tightening adjustment of the diverter along its axis. However, such adjustment will not reduce leakage between the radial ribs and stop members.

A reduction of the distortion and leakage problems in the aforementioned pipe valve may be provided by manufacturing the valve housing of substantially stronger non-deformable material and by machining the contacting sealing surfaces to much closer tolerances. However, such procedures are costly and may make the value uneconomic from a commercial standpoint.

It is a task of the present invention to reduce the complexity of four-way valves such as of the type disclosed in U.S. Pat No. 3,973,592 by providing a "pipe" valve of less complexity and wherein pressure drop in normal position is substantially reduced by providing straight-through fluid flow.

It is a further task of the present invention to reduce the difficulties discovered with the pipe valve of my aforesaid application so that possible distortion of the valve housing will not effectively reduce the sealing efficiency thereof, either at the ends of the tubular diverter or between the diverter and the end closure plates for the cylindrical housing walls.

It is yet another task of the invention to permit tightening adjustment of all the seals within the valve housing. It is a further task to accomplish all of the above tasks in an economical manner.

In accordance with the various aspects of the invention, a four-way diverter valve is constructed with a rotatable butterfly valve element within the cylindrical valve housing and with said element having a pair of end heads joined by a generally planular central tapered plug of longitudinal extent. The valve plug is modified by having mounted thereon between its ends a tubular diverter means which comprises a pair of transversely extending pipe segments, one mounted on each side of the plug, which forms a baffle. The segments are formed of a piece of circular tubing which is cut down the middle and with the exposed edges cut back a total of the plug thickness. Additionally, the pipe segments are of substantially less length than the diameter of the valve housing and terminate adjacent the plug edges.

The valve housing is connected to two pair of in-line ports and stub pipes are fixedly mounted to the housing wall, communicate with a pair of diagonally opposed ports, and extend inwardly from the housing wall toward the modified butterfly valve element and the tubular diverter means. The diverter pipe segment ends are free of the housing wall at all times. In normal valve position, a generally straight-through fluid flow is provided. In reverse valve position, the ends of the diverter pipe segments engage the ends of the stub pipes to provide a diagonally reverse fluid flow channel.

Only two opposed cage bars are utilized with the butterfly plug edges sealing against the cage bars for substantially the full axial extent of the cylindrical housing, in normal valve position. The butterfly valve heads also seal against annular sealing surfaces on the housing. Simultaneously controllable sealing is accomplished both within and without the tubular diverter means.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
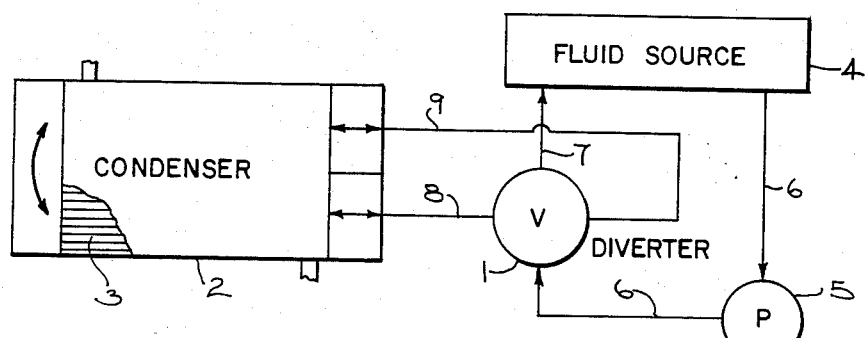
FIG. 1 is a schematic showing of a heat exchange system to which the fluid flow diverter valve of the present invention may be applied.
Figure 2:
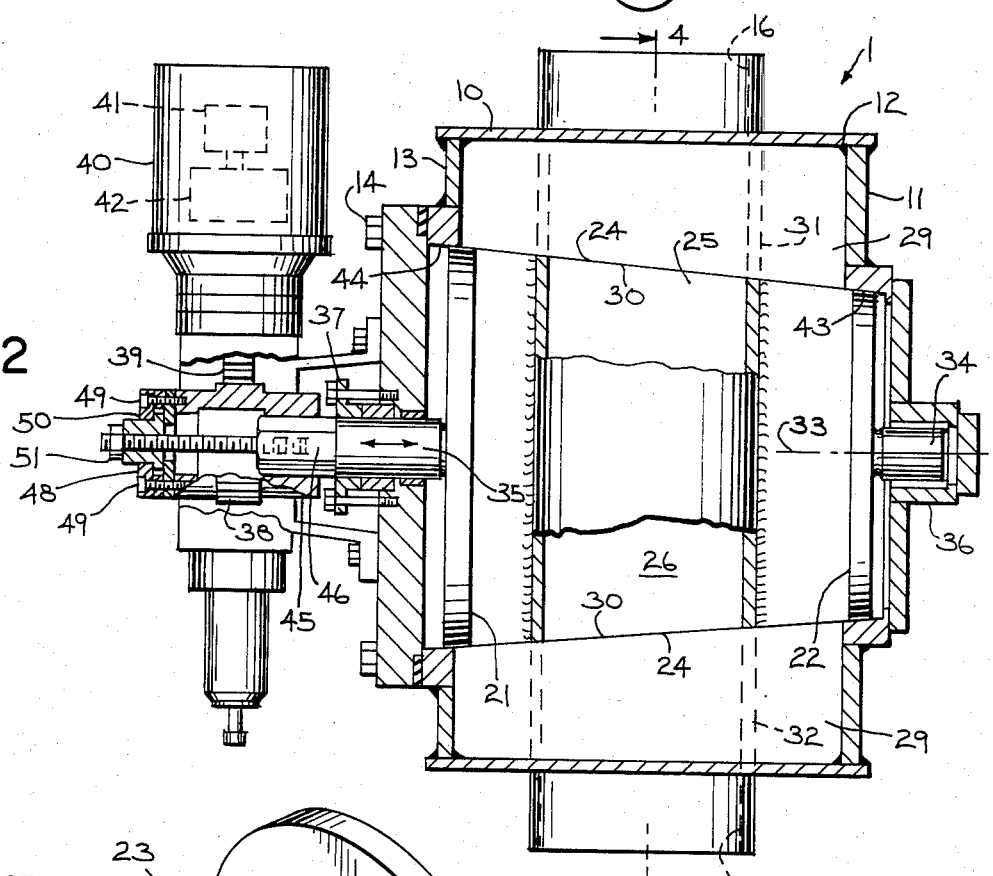
FIG. 2 is a side elevation of the valve of the invention, with the diverter means in normal position, showing certain control means therefor, and with parts broken away and in section.

The fluid flow diverter valve 1 of the invention is shown schematically in FIG. 1 and may be utilized in connection with a process device such as a heat exchange condenser 2 having a plurality of tubes 3 therein. Diverter valve 1 normally supplies cooling water from a fluid source 4 such as a lake or the like and flow thereof is continuously generated by a pump 5. The diverter is connected to pump 5 and source 4 through a suitable fluid supply line 6, and also to source 4 by a suitable return line 7. A pair of lines 8 and 9 connect diverter valve 1 to condenser 2 in the conentional manner. Diverter valve 1 is actuatable to reverse the flow in lines 8 and 9 so that tube cleaning brushes, not shown, can shuttle back and forth in condenser tubes 3 from time to time.

Turning now to FIGS. 2-6, valve 1 is shown as having a housing including a cylindrical wall 10 closed at one end by a wall or plate 11 secured thereto as by welds 12, and closed at its other end by a wall or plate 13 secured thereto as by bolts 14. The construction forms an internal cylindrical valve chamber 15.

Cylindrical wall 10 is provided with a pair of spaced ports 16 and 17 which are upstream in the loop formed with source 4 and condenser 2 (see FIG. 1), and always function as supply and return ports respectively. Similarly, wall 10 includes a pair of spaced downstream ports 18 and 19 connected to lines 8 and 9 to condenser 2. As shown, the construction provides diametrically opposed in-line pairs of ports.

Figure 3:
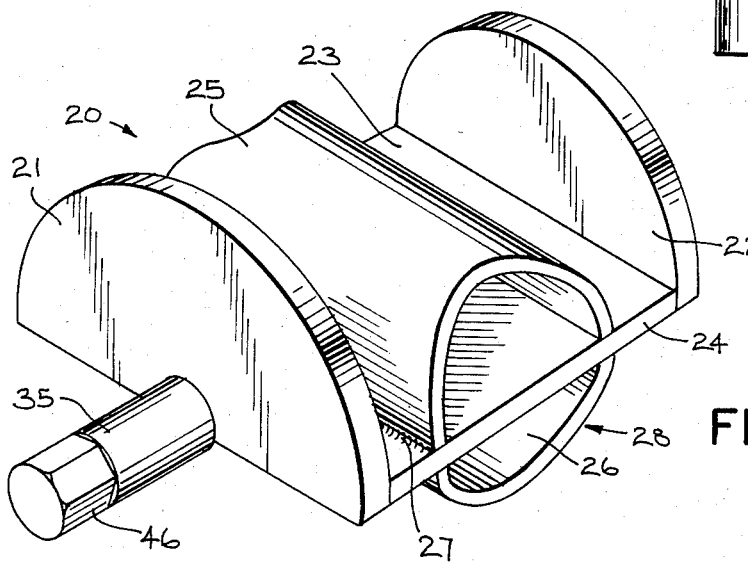
FIG. 3 is a perspective view of the modified butterfly valve element.

For purposes of diverting fluid flow through valve 1, a rotatable butterfly valve element 20 is disposed within the valve housing. As best shown in FIG. 3, valve element 20 comprises the usual pair of arcuate end heads 21, 22 which are joined by a generally planular longitudinally extending central plug 23 having a pair of tapered edges 24.

In accordance with the aspects of the invention, valve element 20 is modified by mounting a pair of transverse tubular pipe segments 25, 26 in opposed relationship on opposite faces of the intermediate portion of plug 23. Segments 25, 26 may be formed by cutting a piece of circular tubing lengthwise and then cutting the resultant exposed edges back an amount sufficient to compensate for the plug thickness, and are mounted to plug 23, as by welds 27.

The construction provides a tubular diverter means 28 wherein pipe segments 25, 26 extend only the width of plug 23, terminate adjacent plug edges 24, and are separated by a baffle formed by a central portion of the plug.

For purposes of accommodating the modified valve element 20, the interior of the valve housing is provided with a pair of diametrically opposed cage bars 29 which are mounted to cylindrical wall 10 and extend longitudinally between end plates 11 and 13. Cage bars 29 are provided with tapered edges 30 which are adapted to sealingly seat edges 24 of plug 23 when valve element 20 is in its normal position, shown in FIGS. 2 and 4. In addition, and further in accordance with the aspects of the invention, a pair of diagonally positioned upstream and downstream housing ports (In this embodiment, ports 16 and 19) are provided with tubular stub pipes 31, 32 which are fixedly mounted to housing wall 10 are surround their respective ports. Stub pipes 31, 32 extend generally radially inwardly toward pipe segments 25, 26 and are of generally the same diameter as the tubular diverter means 28. The combined length of stub pipes 31, 32 together with the length of the pipe segments 25, 26 is generally equal to the diameter of cylindrical housing 10.

Valve element 20, and thus diverter means 28, are mounted for rotation between operative positions about a transverse axis 33 coinciding with the center axis of cylindrical housing wall 10. For this purpose, valve element 20 is secured to a pair of stub axles 34 and 35 which are journalled in respective bearings 36 nd 37 on respective plates 11 and 13. A pinion 38 is disposed on an outer extension of stub axle 35 and meshes with a rack 39 extending from an actuator 40 having the usual motor 41 and gear box 42 connected to the rack. Selective actuation of motor 41 thus causes valve element 20 to rotate on axis 33 between a normal position parallel to the in-line ports, as in FIGS. 2 and 4, and a rotated position, as in FIG. 5.

Figure 4:
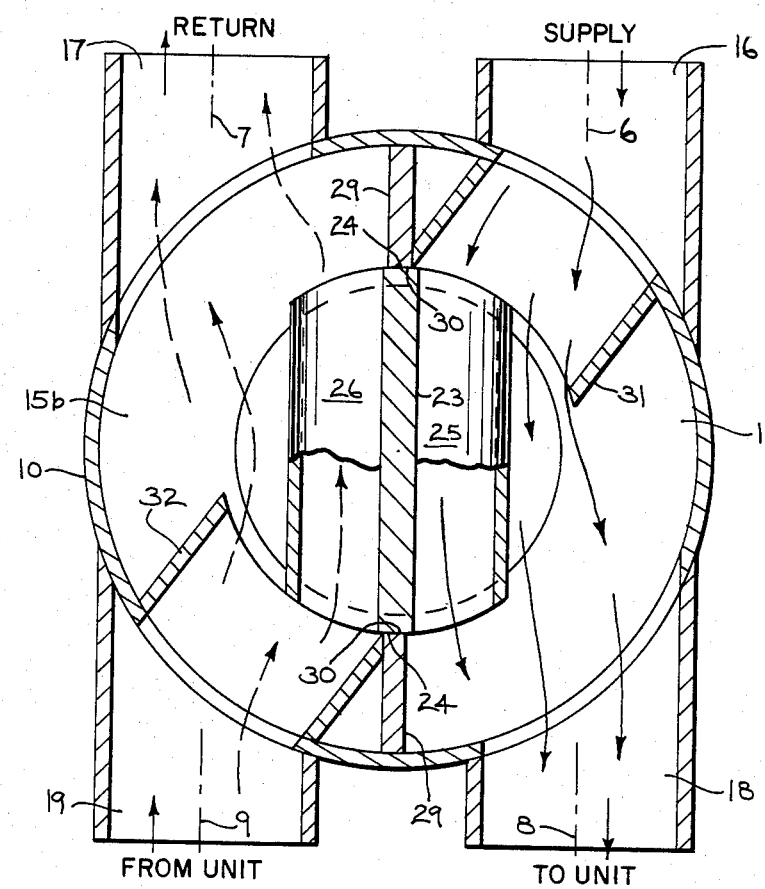
FIG. 4 is a vertical section taken on line 4—4 of FIG. 2 and showing the valve element in normal position.

Referring especially to FIG. 4, when butterfly valve element 20 is rotated to its normal position, plug 23 is sealingly seated against cage bars 29 and pipe segments 25 and 26 form opposed parallel flow-through fluid paths. Fluid flows in through supply port 16, through a chamber 15a and pipe segment 25 and out port 18 in a generally straight line. Return fluid flows in through port 19, through a chamber 15b and pipe segment 26 and out return port 17, parallel to but reversed from the supply flow. The straight run-through of fluid in both directions provides a low pressure drop.

Figure 5:
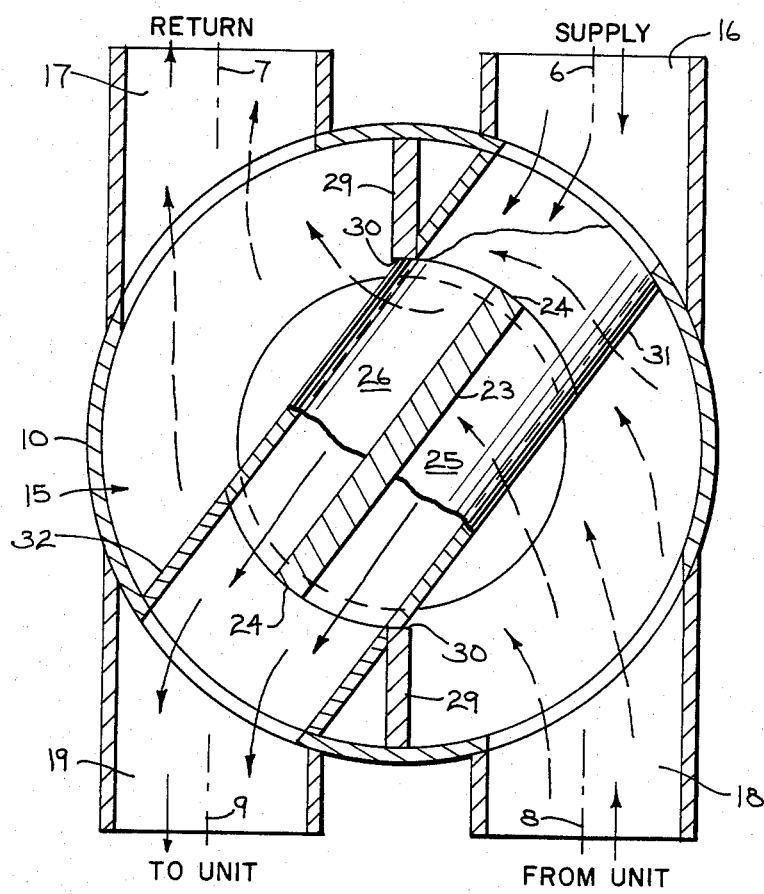
FIG. 5 is a view similar to FIG. 4 with the valve element in reverse position.
Figure 6:
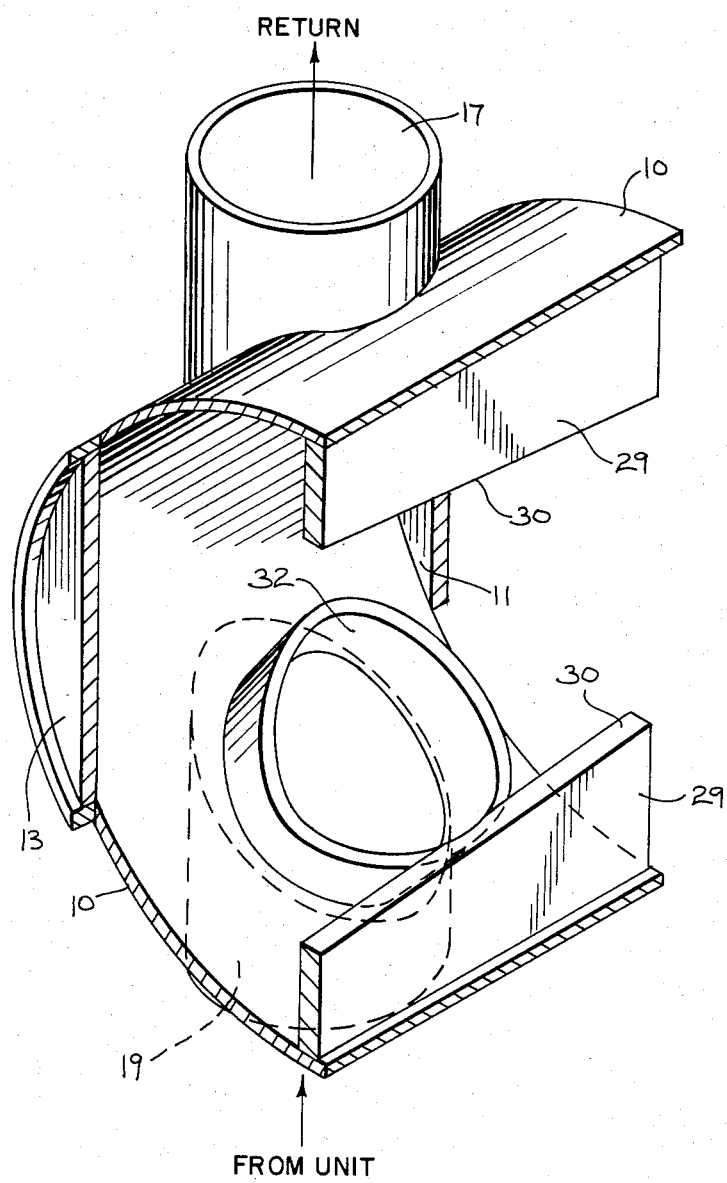
FIG. 6 is a fragmentary perspective view of the one side of the valve housing interior, the opposite side being a mirror image thereof.

Referring to the reverse flow position of FIG. 5, plug 23 is unseated from cage bars 29. Fluid flows in through supply port 16 and through a confined passageway formed by stub pipe 31, pipe segments 25 and 26, and stub pipe 32, and discharges through port 19. Return fluid enters port 18, flows through chamber 15 around the outside of the said confined passageway and discharges through port 17.

It should be noted that the ends of pipe segments 25 and 26 are spaced from and free of housing wall 10 in both positions of valve element 20. In the normal position of FIG. 4 the pipe segment ends are freely exposed, while in the reverse position of FIG. 5 the pipe segment ends engage and mate with the ends of stub pipes 31 and 32. This engagement is not intended to be a tight sealing fit of close tolerance, since sealing in reverse is not particularly critical. The result is that possible distortion in cylindrical housing wall 10 is not transferred to pipe segments 25 and 26.

The primary sealing occurs in normal diverter position, which is used a great percentage of the time. The sealing is accomplished through close fitting engagement between valve element heads 21 and 22 and annular sealing surfaces 43 and 44 on the housing adjacent plates 11 and 13 respectively; and between plug edges 24 and cage bar edges 30 respectively. The construction is such that edges 30 merge into the sealing surfaces 43 and 44, so a complete seal is created along the full axial extent of the valve interior. See FIG. 2. Thus, sealing prevention of fluid flow bypass from the high pressure supply side to the lower pressure return side occurs both within and without tubular diverter means 28. The internal sealing is accomplished by engagement of the intermediate portion of plug edges 24 between the walls of pipe segments 25 and 26 with the adjacent intermediate portions of cage bar edges 30. The external sealing is accomplished by engagement of the end portions of plug edges 24 external to diverter means 28 with the adjacent end portions of cage bar edges 30; and also the engagement of heads 21 and 22 with surfaces 43 and 44.

The above-described internal and external sealing is sumulataneously controllable as to tolerance by selectively shifting valve element 20 along its axis 33. For this purpose, and in the present embodiment, pinion 38 forms part of a hollow housing 45, one end of which slidingly receives a hex-shaped end 46 of stub shaft 35. A threaded shaft 47 extends axially through housing 45 with its inner end threaded into end 46. A retainer 48 is fixedly secured to the outer end of housing 45, as by bolts 49, and serves to capture an adjusting nut 50 through which shaft 47 is threaded. A lock nut 51 is also threaded on shaft 47 and serves to tighten or loosen nut 50. When adjusting nut 50 is loosened and manually turned, valve element 20 is thereby moved axially in the desired direction to provide a tolerance adjustment and thereby increase or reduce the sealing function.

While tubular segments 25, 26 and stub pipes 31, 32 are shown as generally circular in shape, they could be of other configuration without departing from the spirit of the invention.

Various modes of carrying out the invention are contemplated as being within the scope of the following claims particularly pointing out and distinctly claiming the subject matter which is regarded as the invention.

I claim:

1. A diverter valve for connection between a source of pressurized fluid and a process device, comprising, in combination:
    (a) an enclosed housing having a generally cylindrical wall (10) closed by end walls (11, 13) to form a cylindrical valve chamber,
    (b) a pair of upstream supply (16) and return (17) ports disposed in said housing for connection to the fluid source,
    (c) a pair of downstream output and input ports (18, 19) disposed in said housing for connection to the process device,
    (d) and means mounted in said housing for selectively connecting one of said upstream ports with one or the other of said downstream ports and for connecting the other of said upstream ports with one or the other of said downstream ports, said connecting means comprising:
        (1) a valve element (20) rotatable between normal and reverse positions and including a pair of end heads (21, 22) joined by a longitudinally extending seatable element (23) having a pair of tapered edges (24),
        (2) tubular fluid flow diverter means (28) mounted on said element (23) and extending transversely thereof, said tubular fluid flow diverter means (28) being disposed substantially radially inwardly from said cylindrical wall (10),
        (3) and connector means (31, 32) fixedly secured to said cylindrical wall for forming a passage connecting said tubular fluid flow diverter means (28) to one of said upstream (16) and one of said downstream (19) ports when said valve element is in one of its said positions.

2. The combination of claim 1 in which said tubular fluid flow diverter means (28) comprises:
    (a) a pair of opposed pipe segments (25, 26) mounted to the opposite faces of said element (23) with said element portion therebetween forming a baffle,
    (b) said pipe segments being shorter than the diameter of said cylindrical housing wall (10) and terminating adjacent said tapered element edges (24),
    (c) said pipe segments being disposed intermediate the ends of said element between said heads (21, 22).

3. The combination of claim 2 in which said pair of pipe segments (25, 26) are formed from members which are cut back to compensate for the thickness of said element (23).

4. The combination of claim 2 in which:
    (a) the ends of said pipe segments (25, 26) are freely exposed when said valve element (20) is in its said normal position and cooperate with said connector means (31, 32) to provide generally straight-through fluid supply and return flow,
    (b) and the ends of said pipe segments (25, 26) are in engagement with said connector means (31, 32) when said valve element (20) is in its said reverse position.

5. The combination of claim 4 in which said pairs of upstream and downstream ports are generally in-line and said connector means comprises:

(a) a pair of radially inwardly extending stub pipes (31, 32) fixedly mounted to said cylindrical housing wall (10) and respectively communicating with a pair of diagonally opposed upstream and downstream ports (16, 19), (b) the inner ends of said stub pipes being generally of the same diameter as that of said tubular diverter means (28) for mutual engagement to form a channel to divert fluid flow diagonally through the valve when said valve element (20) is in its said reverse position.

6. The combination of claim 5 wherein the combined length of said stub pipes (31, 32) together with the length of said tubular diverter means (28) is generally equal to the diameter of said cylindrical housing wall (10).

7. The combination of claim 4 wherein:

(a) said valve housing contains a pair of opposed cage bars (29) having tapered sealing edges (30) corresponding generally with said tapered edges (24) of said element (23), (b) said element edges (24) engage said cage bar edges (30) when said valve element (20) is in its said normal position, (c) and said element edges (24) are freely exposed when said valve element (20) is in its said reverse position.

8. The combination of claim 7 which includes sealing means disposed both internally and externally of said tubular fluid flow diverter means (28) for separating the supply and return fluid flows when said valve element (20) is in its normal position.

9. The combination of claim 8 which includes means (47, 50) to adjust the tolerance of both said internal and said external sealing means.

10. The combination of claim 8 wherein said internal sealing means comprises the intermediate portion of said element edges (24) disposed between the walls of said pipe segments (25, 26) together with the adjacent intermediate portions of cage bar edges (30).

11. The combination of claim 8 or 10 wherein said external sealing means comprises the end portions of said element edges (24) disposed on either side of said pipe segments (25, 26) together with the adjacent end portions of said cage bar edges (30).

12. The combination of claim 11 which includes annular sealing surface means (43, 44) disposed adjacent said housing end walls (11, 13) and sealingly engageable by said end heads (21, 22) respectively to thereby form a further sealing means external to said tubular fluid flow diverter means (28).

* * * * *